United States Patent [19]
Handlin, Jr.

[11] Patent Number: 4,804,472
[45] Date of Patent: Feb. 14, 1989

[54] POLYKETONE MEMBRANES

[75] Inventor: Dale L. Handlin, Jr., Houston, Tex.

[73] Assignee: Shell Oil Company, Houston, Tex.

[21] Appl. No.: 139,487

[22] Filed: Dec. 30, 1987

[51] Int. Cl.$^4$ .................. B01D 13/00; B01D 13/04
[52] U.S. Cl. ...................... 210/500.27; 264/216; 264/DIG. 48; 264/DIG. 62
[58] Field of Search ............ 210/638, 640, 500.27, 210/500.33; 568/493, 913; 264/216, 41, DIG. 48, DIG. 62; 524/205, 259, 321, 377, 390, 465, 475, 592

[56] References Cited

U.S. PATENT DOCUMENTS

| | | | |
|---|---|---|---|
| 2,495,286 | 1/1950 | Brubaker | 260/63 |
| 3,558,764 | 1/1971 | Isaacson et al. | 264/210 |
| 3,679,538 | 7/1972 | Druin et al. | 161/159 |
| 3,689,460 | 9/1972 | Nozaki | 260/63 |
| 3,694,412 | 9/1972 | Nozaki | 260/63 |
| 3,929,727 | 12/1975 | Russell et al. | 260/45.95 |
| 3,948,832 | 4/1976 | Hudgin | 260/23 |
| 3,948,850 | 4/1976 | Hudgin | 260/45.7 |
| 3,948,873 | 4/1976 | Hudgin | 260/94.9 |
| 3,968,082 | 7/1976 | Hudgin | 260/45.85 |
| 4,024,104 | 5/1977 | Russell et al. | 260/45.8 |
| 4,139,522 | 2/1979 | Lantos | 260/45.75 |
| 4,247,498 | 1/1981 | Castro | 264/41 |
| 4,728,429 | 3/1988 | Cabasso et al. | 210/638 |

FOREIGN PATENT DOCUMENTS 0121965 10/1984 European Pat. Off.
0181014 5/1986 European Pat. Off.

OTHER PUBLICATIONS

"Novel Palladium(II)-Catalyzed Copolymerization of Carbon Monoxide With Olefins", J. Am. Chem. Soc. 1982, 104, 3520-3522.

Primary Examiner—Frank Sever
Attorney, Agent, or Firm—Wendy K. B. Buskop

[57] ABSTRACT

A separation membrane having cell sizes in the range of 0.1 to 10 microns, prepared by:

mixing at least one linear alternating polymer of carbon monoxide and at least one ethylenically unsaturated hydrogen in a solvent forming a solution;

casting said solution on a substance, and removing at least a portion of said solvent.

18 Claims, No Drawings

POLYKETONE MEMBRANES

BACKGROUND OF THE INVENTION

This invention is concerned with separation membranes containing substantial amounts of polyketone polymers.

This invention relates to porous polymer structures and a method of preparing the same. More particularly, this invention relates to microporous polymer structures that may be readily prepared and are characterized by relatively homogeneous, three-dimensional, cellular microstructures and to a unique, facile process for preparing microporous polyketone polymer structures.

A variety of techniques and types of microporous membranes are taught in U.S. Pat. No. 4,247,498.

It has now been discovered that polyketone-based polymer may be rendered microporous.

The general class of polymers of carbon monoxide and one or more ethylenically unsaturated hydrocarbons has been known for some years. Brubaker, U.S. Pat. No. 2,495,286, produced such polymers of relatively low carbon monoxide content in the presence of free radical catalysts such as benzoyl peroxide. British Pat. No. 1,081,304 produced such polymers of higher carbon monoxide content in the presence of alkylphosphine complexes of palladium as catalyst. Nozaki extended the process to arylphosphine complexes of palladium. See, for example, U.S. Pat. No. 3,694,412.

More recently, the class of linear alternating polymers of carbon monoxide and unsaturated hydrocarbons, now known as polyketones, has become of greater interest, in part because of improved methods of production. Such methods are shown by European Patent Applications Nos. 0,181,014 and 0,121,965. The disclosed processes employ, inter alia, a compound of a Group VIII metal such as palladium, an anion of a non-hydrohalogenic acid having a pKa below 2 and a bidentate ligand of phosphorous. The resulting polymers are generally high molecular weight thermoplastic polymers having utility in the production of articles such as membranes for a wide variety of end uses.

U.S. Pat. Nos. 3,689,460 and 3,694,412 disclose two other processes for preparing polyketones. The catalysts described therein are complexes of a palladium, chloride or allyl palladium chloride and two trihydrocarbyl phosphine monodentate-like ligands, such as triphenylphosphine.

Another process for preparing polyketones is discussed by Sen and Li in an article entitled "Novel Palladium (II)-Catalyzed Copolymerization of Carbon Monoxide With Olefins", J. Am. Chem. Soc. 1982, 104, 3520–3522. This process generates higher yield than the other disclosed processes.

Yet another process for preparing polyketones is disclosed in a currently copending U.S. patent application Ser. No. 908,899, filed Sept. 18, 1986. The process of the copending application is directed towards a preparation of polyketones to obtain a high yield, wherein a mixture of carbon monoxide and alkenically unsaturated hydrocarbon is polymerized in the presence of a Group VIII metal catalyst containing ligands, wherein hydrocarbon groups are bonded to an element from Group Va, characterized in that, as catalyst, a complex compound is used that is obtained by reacting a palladium, cobalt or nickel compound, a bidente ligand of the general formula:

$$R_1R_2-M-R-M-R_3R_4,$$

in which M represents phosphorous, arsenic or antimony, $R_1$, $R_2$, $R_3$, and $R_4$ are identical or different hydrocarbon groups, and R represents a divalent organic bridging group having at least two carbon atoms in the bridge, none of these carbon atoms carrying substituents that may cause stearic hindrance, and an anion of an acid with a pKa of less than two, provided the acid is neither a hydrohalogenic acid nor a carboxylic acid.

Polyketones have generally not been used as separation membranes. The excellent strength, good solvent resistance, high melting point and hydrophilic nature of the polyketone polymers make them suitable for microfiltration applications.

Certain novel microporous polyketone-based polymers of the present invention are characterized by being non-continuous and having a narrow cell size distribution, as determined by electron microscopic analysis.

SUMMARY OF THE INVENTION

The present invention relates to a microporous non-continuous separation membrane having cell sizes in the range of 0.1 to 10 microns, prepared by:
mixing at least one linear alternating polymer of carbon monoxide and at least one ethylenically unsaturated hydrocarbon in a solvent forming a solution;
casting said solution on a substrate; and
removing at least a portion of said solvent.

The present invention also relates to a method for making a microporous non-continuous separation membrane having cell sizes in the range of 0.1 to 10 microns comprising the steps of:
mixing at least one linear alternating polymer of carbon monoxide and at least one ethylenically unsaturated hydrocarbon in a solvent forming a solution;
casting said solution on a substrate; and
removing at least a portion of said solvent therein forming a microporous non-continuous separation membrane.

The present invention is particularly characterized by average cell sizes which range from about 0.1 to about 10 microns, with about 0.1 to about 6 micron cell sizes being preferred for certain end use applications, and about 0.1 to about 2 microns being preferred for other end uses.

DETAILED DESCRIPTION OF THE INVENTION

Broadly, the instant invention is prepared by mixing a polyketone polymer with an appropriate compatible liquid to form a solution. From the solution a solid material can be formed such as by casting on a substrate, like glass, then and subsequently removing any remaining liquid from the solid material. Extraction or evaporation can be used to remove, at least a portion of the liquid to form the desired, novel microporous material. The considerations involved in practicing the instant invention will be described in detail hereinbelow.

Usable polyketone polymers can be typically produced by contacting the carbon monoxide and the ethylenically unsaturated hydrocarbon(s) under polymerization conditions in the process of a catalytic amount of a catalyst formed from a compound of the Group VIII metals palladium, cobalt or nickel, the anion of a non-hydrohalogenic acid of a pKa less than about 6, preferably less than about 2, and a bidentate ligand of phosphorous, arsenic or antimony. Although the scope of the polymerization is extensive, for purposes of illustration, a preferred Group VIII metal compound is palladium acetate, the anion is the anion of an acid selected from trifluoroacetic acid and paratoluenesulfonic acid and the bidentate ligand is selected from 1,3-bis(diphenylphosphino)propane and 1,3-bis[di(2-methoxyphenyl)phosphino]propane.

Polymerization is carried out at polymerization conditions, typically at elevated temperature and pressure, in the gaseous phase or in the liquid phase in the presence of an inert diluent, e.g., a lower alcohol such as methanol or ethanol. The reactants are contacted by conventional methods such as stirring or shaking and subsequent to reaction the polymer product is recovered as by decantation or filtration. The polymer product may contain metallic residues from the catalyst which are removed by contact with a solvent which is selective for the residues. Production of these polymers is illustrated, for example, by published European Patent Applications Nos. 0,181,014 and 0,121,965.

The physical properties of the polyketone polymer usable in the separation membranes will be determined by the molecular weight, by whether the polymer is a copolymer or a terpolymer or other type of interpolymer, by melting points and by the actual moiety structure. It is preferred to use for the novel membranes, polyketone polymers with melting points in the range of from about 175° C. to about 300° C., more typically from about 210° C. to about 280° C.

The structure of the preferred polyketone polymer usable herein is that of a linear alternating polymer of carbon monoxide, ethylene and any second ethylenically unsaturated hydrocarbon. Polyketone terpolymers are usable herein provided they are terpolymers of carbon monoxide, ethylene and a second ethylenically unsaturated hydrocarbon, e.g., a hydrocarbon of at least 3 carbon atoms, wherein there are at least two units incorporating moieties of ethylene per unit incorporating a moiety of the second unsaturated hydrocarbon, preferably from about 10 units to about 100 units incorporating moieties of ethylene per unit incorporating a moiety of the second unsaturated hydrocarbon. The polymer chain of the preferred class of polymers is illustrated by the formula

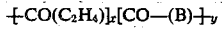

$$\mathrm{+CO(C_2H_4)]_x[CO-(B)]_y}$$

wherein B is the moiety obtained by polymerization of the second ethylenically unsaturated hydrocarbon through the ethylenic unsaturation. The $-CO(C_2H_4)-$ units and the $-CO(B)-$ units occur randomly throughout the polymer molecule and the ratio of y:x is no more than about 0.5. In the modification of the invention which employs copolymers of carbon monoxide and ethylene without the presence of a second ethylenically unsaturated hydrocarbon, the term y=0 and the ratio of y:x is also 0. When terpolymers are employed, i.e., y is greater than 0, ratios of y:x from about 0.01 to about 0.1 are preferred. The end groups or "caps" of the polymer chain will depend on the particular materials present during its production and whether and how the polymer has been purified. The precise nature of the end groups is of little significance with regard to the overall properties of the polymer so that the polymer is fairly represented by the polymer chain as depicted above.

Preferred polyketone polymers unable to prepare these unique separation membranes are copolymers of carbon monoxide and ethylene or terpolymers of carbon monoxide, ethylene and a second aliphatic α-olefin like propylene. Olefins having 3 or more carbon atoms are particularly usable as the second α-olefin herein.

Useful polyketones for separation membranes have limiting viscosity numbers (LVN) as measured by the method wherein the polymer is dissolved in metacresol at 100° C., using a standard capillary viscosity measuring device, such as a Cannon-Ubbelohde viscometer in the range of 0.5 to 10 LVN and more preferably 0.8 to 4 LVN.

It has been found in accordance with the instant invention that the desired separation membranes can be obtained from solution cast films of (a) a polyketone polymer or copolymer, such as one of the types described above, in (b) a solvent of either hexafluoroisopropanol (HFIPA) meta-cresol (m-cresol) or ortho-chlorophenol. Components (a) and (b) are blended together in relative proportions, preferably 0.01 to 1 gram of (a) per 1-50 mil of (b) to form a solution. The solution is cast on a substrate to form a solid material. At least some of the liquid is then removed. Other solvents besides HFIPA and m-cresol may be usable as the solvent, such as ortho-chlorophenol, provided tht when the other solvents are blended with the polyketone polymer, they assist in forming a non-continuous microporous separation membrane.

For these separation membranes, it has been discovered that component (a) can be a blend of two or more polyketone polymers having different molecular weights or different melting points. For example, a polyketone having a low melting point (prepared from a polyketone having a larger termonomer content) can be added to second a polyketone polymer with a higher melting point dry blended, (such as in a tumbler or plastic bag) to provide a blend of polyketone polymers usable in the instant invention.

The most preferred blend usable to prepare separation membranes can be prepared from about 0.1 grams of a polyketone polymer, such as terpolymer of propylene and ethylene or a polyketone copolymer of propylene herein after identified as component (a), and, about 10 ml of a component (b) which is preferably hexafluoroisopropanol (HFIPA). It has been discovered that 10% (by volume) solutions of polyketone polymer with HFIPA, when cast onto glass, using a 10 mil Doctor blade, result in a separation membrane that is particularly advantageous. It may take up to 4 hours to form the appropriate solution of polymer with HFIPA. Blending of solvent and polymer can be achieved by the "wrist-shaker" method, well known in the art. Concentrations between 5% and 20% of polyketone polymer be used in this invention.

After the compatible liquid and the polyketone polymer are selected, the actual concentration of polymer and liquid which will be utilized must be determined. In addition to considering, for example, the theoretically possible concentration range, other functional considerations should be employed in determining the proportions used for a particular system. Insofar as the maximum amount of liquid which should be utilized is concerned, the resulting strength characteristics of the membrane must be taken into account. More particularly, the amount of liquid used should accordingly allow the resulting microporous structure to have sufficient minimum "handling strength" to avoid collapse of the microporous or cellular structure. On the other hand, the selection of the maximum amount of resin may depend on viscosity limitations of the particular equipment utilized.

The relative amount of liquid used will also, to some extent, be dependent upon the desired effective size of the membrane cells for use in the ultimate end-use applications. It should be noted that the average cell size tends to increase somewhat with increasing liquid content.

Following the formation of the 10% solution, the same may then be processed to provide a membrane of any desired shape or configuration. In general, and depending upon the particular system involved, the thickness of the membrane can vary from a thin film of about 0.5 mil to up to about 20 mil in thickness.

Increased thicknesses may also be achieved by the addition of minor amounts of thixotropic materials. For example, the addition of commercially available fillers significantly increases useful thicknesses yet does not adversely affect the characteristic microporous structure. The particular amounts to be used can be readily determined.

Having formed the solution of polymer and liquid and cast the solution to produce a material having suitable handling strength, the cast solution may be thereafter formed by removing the liquid by, using nonsolvents. Nonsolvents usable to remove the liquid from the membrane include isopropyl alcohol, acetone, water, and other polar solvents which are miscible with the solvent used in association with the polyketone polymer.

The average size of the cellsl in the resulting non-continuous structure can range from about 0.1 to about 10 microns, with from about 0.1 to about 6 microns being a range usable herein. As indicated, the cell size of the resulting membrane may vary depending on the particular polyketone resin and compatible liquid utilized and the ratio of the polymer to liquid. All references to a cell size throughout this application, relate to the average diameter of such cells, in microns, unless otherwise stated. All references to a "non-continuous" membrane relate to a membrane which has cells extending entirely through the thickness of the membrane, from one side to the other, similar to a "swiss-cheese" type structure.

For any of the microporous polymers made in accordance with the present invention, the particular end use application will typically determine the amount of void space and cell size requirements for the membrane. For example, for prefilter applications, the cell size may typically be above 6 microns while, in microfiltration, the cell sizes may be in the range of about 0.1 to about 2 microns.

ILLUSTRATIVE FORMULATIONS

The following examples are included as illustrations but are not intended to limit the scope of the claims.

Membrane A:

1.0 gram 054/005 polyketone powder, a linear alternatign terpolymer of carbon monoxide and ethylene produced in the presence of a catalyst composition formed from palladium acetate, the anion of trifluoroacetic acid and 1,3-bis[di(2-methoxyphenyl)phosphino]propane, with a melting point of 257° C. and a LVN (limiting viscosity number) of 3.05 as measured at 100° C. in m-cresol, was dissolved in 10 ml hexafluoroisopropanol solvent, forming a solution. The solution was cast onto a glass substrate using a 10 mil Doctor Blade. A membrane or film formed and the film was placed in a non-solvent of isopropyl alcohol at room temperature for 1-10 minutes removing all of the HFIPA from membrane and leaving a unique microporous polyketone non-continuous membrane with a 1.0 to 5 micron cell size, and a high melting point, of at least 250° C.

Membrane B:

1.0 gram 054/005 polyketone powder, a linear alternating terpolymer of carbon monoxide and ethylene produced in the presence of a catalyst composition formed from palladium acetate, the anion of trifluoroacetic acid and 1,3-bis[di(2-methoxyphenyl)phosphino]propane, with a melting point of 257° C. and a LVN (limiting viscosity number) of 3.05 as measured at 100° C. in m-cresol, was dissolved in 10 ml hexafluoroisopropanol solvent, forming a solution. The solution was cast onto a glass substrate using a 10 mil Doctor Blade. A membrane or film formed and the film was placed in a non-solvent of water at room temperature for 1-10 minutes removing all of the HFIPA from membrane and leaving a unique microporous polyketone non-continuous membrane with a 0.1 to 2 micron cell size, and a high melting point, of at least 250° C.

Membrane C:

1.0 gram 054/005 polyketone powder, a linear alternating terpolymer of carbon monoxide and ethylene produced in the presence of a catalyst composition formed from palladium acetate, the anion of trifluoroacetic acid and 1,3-bis[di(2-methoxyphenyl)phosphino]propane, with a melting point of 257° C. and a LVN (limiting viscosity number) of 3.05 as measured at 100° C. in m-cresol, was dissolved in 10 ml hexafluoroisopropanol solvent, forming a solution. The solution was cast onto a glass substrate using a 10 mil Doctor Blade. A membrane or film formed and the film was placed in a non-solvent of isopropyl alcohol at −20° C. for 1-10 minutes removing all of the HFIPA from membrane and leaving a unique microporous polyketone non-continuous membrane wiht a 5 to 10 micron cell size, and a high melting point, of at least 250° C.

Membrane D:

1.0 gram 054/005 polyketone powder, a linear alternating terpolymer of carbon monoxide and ethylene produced in the presence of a catalyst composition formed from palladium acetate, the anion of trifluoroacetic acid and 1,3-bis[di(2-methoxyphenyl)phosphino]propane, with a melting point of 257° C. and a LVN (limiting viscosity number) of 3.05 as measured at 100° C. in m-cresol, was dissolved in 10 ml hexafluoroisopropanol solvent, forming a solution. The solution was cast onto a glass substrate using a 10 mil Doctor Blade. A membrane or film formed and the film was placed in a non-solvent of isopropyl alcohol at 65° C. for 1-10 minutes removing all of the HFIPA from membrane and leaving a unique microporous polyketone non-continuous membrane with a 0.1 to 2 micron cell size, and a high melting point, of at least 250° C.

What is claimed is:

1. A microporous non-continuous separation membrane having cell sizes in the range of 0.1 to 10 microns, prepared by:

mixing at least one linear alternating polymer of carbon monoxide and at least one ethylenically unsaturated hydrocarbon wherein said at least one linear alternating polymer of carbon monoxide is of the formula

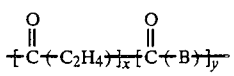

wherein B is the moiety of an ethylenically unsaturated α-olefin of at least 3 carbon atoms polymerized through the ethylenic unsaturation, and the ratio of y:x is no more than about 0.5, in a solvent forming a solution;

casting said solution on a substrate; and removing at least a portion of said solvent.

2. The membrane of claim 1, wherein the α-olefin is propylene and the ratio of y:x is from about 0.01 to about 0.2.

3. The membrane of claim 1, wherein said solvent is selected from the group: meta-cresol, hexafluoroisopropanol, and ortho-chlorophenol.

4. The membrane of claim 1, wherein said substrate is glass.

5. The membrane of claim 1, wherein the cell size is in the range of about 0.1 to about 6 microns.

6. The membrane of claim 1, wherein the cell size is in the range of about 0.1 to about 2 microns.

7. The membrane of claim 1, wherein all of said solvent is removed from the cast solution.

8. A method for making a microporous non-continuous separation membrane having cell sizes in the range of 0.1 to 10 microns comprising the steps of:

mixing at least one linear alternating polymer of carbon monoxide and at least one ethylenically unsaturated hydrocarbon wherein said at least one linear alternating polymer of carbon monoxide is of the formula

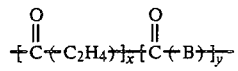

wherein B is the moiety of an ethylenically unsaturated α-olefin of at least 3 carbon atoms polymerized through the ethylenic unsaturation, and the ratio of y:x is no more than about 0.5, in a solvent forming a solution;

casting said solution on a substrate; and removing at least a portion of said solvent therein forming a microporous non-continuous separation membrane.

9. The membrane of claim 8, wherein the α-olefin is propylene and the ratio of y:x is from about 0.01 to about 0.2.

10. The method of claim 8, wherein the solvent is selected from the group: meta-cresol, hexafluoroisopropanol, and ortho-chlorophenol.

11. The method of claim 8, wherein at least a portion of said solvent is removed by extraction.

12. The method of claim 11, wherein said extraction is performed with a member of the group comprising: isopropyl alcohol, water, acetone, non-polar solvents miscible with said solvent, and mixtures thereof.

13. The method of claim 8, wherein the substrate is glass.

14. The method of claim 8, wherein essentially all of the solvent is removed.

15. The method of claim 8, wherein said solution comprises from about 10 to about 90% by weight of said solvent.

16. The method of claim 8, wherein the separation membrane is a film.

17. The method of claim 8, wherein the separation membrane has a cell size in the range of about 0.1 to about 6 microns.

18. The method of claim 8, wherein said separation membrane has a cell size in the range of about 0.1 to about 2 microns.

* * * * *